(12) United States Patent
Zhou et al.

(10) Patent No.: US 10,491,618 B2
(45) Date of Patent: Nov. 26, 2019

(54) METHOD AND APPARATUS FOR WEBSITE SCANNING

(75) Inventors: Da Zhou, Beijing (CN); Xiaoming Wang, Beijing (CN); Ming Lv, Beijing (CN); Hui Jiang, Beijing (CN); Guangxu Liu, Beijing (CN); Xiaohai Lu, Beijing (CN); Na Li, Beijing (CN); Liang Lu, Beijing (CN); Jingjing Zeng, Beijing (CN)

(73) Assignee: NSFOCUS INFORMATION TECHNOLOGY CO., LTD., Beijing (CN)

( * ) Notice: Subject to any disclaimer, the term of this patent is extended or adjusted under 35 U.S.C. 154(b) by 933 days.

(21) Appl. No.: 13/821,867

(22) PCT Filed: Sep. 8, 2011

(86) PCT No.: PCT/CN2011/001526
§ 371 (c)(1),
(2), (4) Date: Apr. 10, 2013

(87) PCT Pub. No.: WO2012/031460
PCT Pub. Date: Mar. 15, 2012

(65) Prior Publication Data
US 2013/0227640 A1  Aug. 29, 2013

(30) Foreign Application Priority Data
Sep. 9, 2010 (CN) .......................... 2010 1 0278838

(51) Int. Cl.
*H04L 29/06* (2006.01)
*H04L 29/08* (2006.01)

(52) U.S. Cl.
CPC ...... *H04L 63/1433* (2013.01); *H04L 63/1483* (2013.01); *H04L 67/02* (2013.01)

(58) Field of Classification Search
CPC .. H04L 63/1433; H04L 67/02; H04L 63/1483
See application file for complete search history.

(56) References Cited

U.S. PATENT DOCUMENTS 7,765,597 B2 *  7/2010  Sima et al. ..................... 726/25
8,239,952 B1 *  8/2012  Oliphant et al. ............... 726/25
(Continued)

FOREIGN PATENT DOCUMENTS

CN   1866817 A   11/2006
CN   1870493 A   11/2006
(Continued)

OTHER PUBLICATIONS

Notification of Reasons for Refusal for Japanese patent application 2013-527447 dated Mar. 11, 2014, 6 pages.
(Continued)

*Primary Examiner* — Samson B Lemma
(74) *Attorney, Agent, or Firm* — Withrow & Terranova, P.L.L.C.

(57) ABSTRACT

A website scanning apparatus having a policy analysis device for determining whether a link in a target website belongs to a known web application used by the target website, if the link belongs to the identified web application, then a vulnerability scanning is not performed on the link; a crawler device for obtaining the link content that the link points to; a web application identification device for determining whether the link belongs to a known web application; a full scan device for performing a full vulnerability scanning on a link determined as not belonging to the known web application; and a known web application vulnerability detection device for performing vulnerability detection on the website for the determined identified web application according to known vulnerabilities of the identified web application to determine whether the known vulnerabilities (Continued)

of the identified web application exist in the website is provided.

18 Claims, 6 Drawing Sheets

(56) References Cited

U.S. PATENT DOCUMENTS

| | | | |
|---|---|---|---|
| 8,286,248 B1* | 10/2012 | Oliphant et al. ............... 726/25 |
| 8,516,590 B1* | 8/2013 | Ranadive ............ H04L 63/1433 |
| | | | 713/187 |
| 8,555,391 B1* | 10/2013 | Demir et al. .................... 726/24 |
| 2008/0120722 A1* | 5/2008 | Sima et al. ...................... 726/25 |
| 2009/0019547 A1* | 1/2009 | Palliyil et al. .................. 726/25 |
| 2010/0023850 A1* | 1/2010 | Jagdale et al. ................ 715/206 |
| 2010/0251329 A1* | 9/2010 | Wei .................................. 726/1 |
| 2011/0047620 A1* | 2/2011 | Mahaffey et al. .............. 726/23 |
| 2011/0219446 A1* | 9/2011 | Ichnowski ..................... 726/22 |
| 2011/0252478 A1* | 10/2011 | Hubbard et al. ................ 726/24 |
| 2011/0314152 A1* | 12/2011 | Loder .......................... 709/225 |
| 2012/0017274 A1* | 1/2012 | Schrecker ....................... 726/22 |
| 2013/0133075 A1* | 5/2013 | Abadi et al. .................... 726/25 |
| 2014/0208426 A1* | 7/2014 | Natarajan et al. .............. 726/23 |
| 2015/0215326 A1* | 7/2015 | Baddour et al. ................ 726/22 |

FOREIGN PATENT DOCUMENTS

| | | |
|---|---|---|
| CN | 1808093 A | 8/2010 |
| JP | H09504395 A | 4/1997 |
| JP | 2009277156 A | 11/2009 |
| JP | 2010250830 A | 11/2010 |

OTHER PUBLICATIONS

International Search Report for PCT/CN2011/001526, dated Dec. 15, 2011.

First Office Action for Chinese patent application 201010278838.9 dated Feb. 21, 2014, 9 pages.

* cited by examiner

```
<root>
<app name="phpnuke">
  <banner>
    <!--  rule 1  -->
    <rule url="index.php">
      <regmatch>
        <regexp><![CDATA[  <meta  name="generator" content="(PHP-Nuke.*|.*http://phpnuke.org)"> ]]></regexp>
      </regmatch>
      <regmatch>
        <regexp><![CDATA[  <META  NAME="RATING"  CONTENT="GENERAL">]]> </regexp>
      </regmatch>
      <version>
        <regexp><![CDATA[  <META  NAME="GENERATOR" CONTENT="PHP-Nuke[ ]*(?P<version>\d+\.\d+).*"> ]]> </regexp>
      </version>
    </rule>
    <!--  rule 2  -->
    <rule url="user.php">
      <regmatch>
        <regexp><![CDATA[  <meta  name="generator" content="(PHP-Nuke.*|.*http://phpnuke.org)"> ]]> </regexp>
      </regmatch>
      <regmatch>
        <regexp><![CDATA[ <META NAME="RATING" CONTENT="GENERAL"> ]]> </regexp>
      </regmatch>
    </rule>
    <!--  rule 3  -->
    <rule url="themes/Freezebeta/style/style.css">
      <md5sum>
        <md5 value="415acd896960884ada364d508e7c8ae9" version="" />
      </md5sum>
    </rule>
  </banner>
</app>
</root>
```

METHOD AND APPARATUS FOR WEBSITE SCANNING

This application is a 35 USC 371 national phase filing of PCT/CN2011/001526, filed Sep. 8, 2011, which claims priority to Chinese national application 201010278838.9, filed Sep. 9, 2010, the disclosures of which are incorporated herein by reference in their entireties.

FIELD OF THE INVENTION

The invention relates to the field of computer network security, and more particularly, to a website scanning apparatus and method for remotely scanning a website to confirm whether the website contains vulnerability.

BACKGROUND OF THE INVENTION

To determine whether a website contains such kinds of vulnerabilities as CGI vulnerability, SQL injection vulnerability, cross-site scripting vulnerability, etc., there is a need to perform a vulnerability scanning for the website from outside the website, namely, remotely, to confirm whether the website contains such vulnerabilities.

Nowadays, a large number of websites on the internet are constructed based on some known web applications. For example, the forum system of a website may be constructed based on known web applications such as Discuz!, phpwind or Dvbbs, etc.; and the blog system of a website may be constructed based on a web application such as WordPress, etc. Such known web applications are already found to have contained some known CGI vulnerabilities. For example, the Discuz! forum contained the bypass global variable defense vulnerability, the manyou plug-in of the Discuz! forum contained the SQL injection vulnerability, and WordPress contained the bypass password protection vulnerability, and so on. Since the application range of the known web applications is very wide, so is the vulnerability study for these web applications, but methods for fixing the vulnerabilities of these known web applications can occur in time. Therefore, these known web applications have gradually become comparatively mature products. The possibility that there exist other vulnerabilities except for those disclosed on the network becomes very low.

Conventional methods for scanning website vulnerability are to traverse in turn all the pages on a website, call a crawler program for every page to obtain the page content to perform an analysis, and perform a comprehensive vulnerability scanning for the pages.

When a conventional website vulnerability scanning method is used to scan those websites constructed based on a known web application, the possibility of scanning out vulnerability is comparatively low. Instead, it will consume a lot of time and bandwidth, and even cause a false positive of vulnerability because of the problem of the scanning program, which gives rise to a customer's unnecessary worry.

Therefore, there is a need for a new website scanning apparatus and method, which may take into account a known web application used by a website and reduce the unnecessary vulnerability scanning process, thereby saving the scanning time and the network bandwidth being occupied to increase the efficiency of the website scanning.

SUMMARY OF THE INVENTION

In view of the above problems, the invention is proposed to provide a website scanning system and a website scanning method which overcome the above problems or at least in part solve the above problems.

According to an aspect of the invention, there is provided a website scanning apparatus comprising a policy analysis device for determining whether a link in a website belongs to an identified web application in the website, if the link belongs to the identified web application, then a vulnerability scanning is not performed on the link; a crawler device for obtaining the link content that the link points to; a web application identification device for determining whether the link belongs to a known web application based on the link and the link content, and determining the known web application as an identified web application in the website when the link belongs to the known web application; a full scanning device for receiving a link determined by the web application identification device as not belonging to a known web application, and performing a full vulnerability scanning on the link; and a known web application vulnerability detection device for receiving an identified web application determined by the web application identification device, and performing a vulnerability detection on the website according to known vulnerabilities of the identified web application, to determine whether the website contains known vulnerabilities of the identified web application.

Optionally, in the website scanning apparatus according to the invention, the web application identification device comprises a rule generation component for generating a set of rules in accordance with features of a known web application; a rule matching engine for obtaining the link and the link content, extracting features of the link and the link content, determining whether one of the rules in the set of rules is matched in accordance with the features of the link and the link content, and determining a known web application corresponding to the matched rule as the known web application the link belongs to. In addition, the features of a known web application comprise one or more of the following features: a specific page and a specific mark in the specific page; a specific page and all the content in the specific page; an HTTP response field; and a specific link.

According to another aspect of the invention, there is provided a website scanning method comprising the steps of: determining, by the policy analysis device, whether a link in a website belongs to an identified web application in the website; not performing a vulnerability scanning on the link if the link belongs to an identified web application, and obtaining, by a crawler device, the link content that the link points to, if the link does not belong to an identified web application; determining, by a web application identification device, whether the link belongs to a known web application based on the link and the link content; determining a known web application as an identified web application in the website if the link belongs to the known web application, and performing, by a known web application vulnerability detection device, a vulnerability detection on the website according to known vulnerabilities of the identified web application, to determine whether the website contains known vulnerabilities of the identified web application; and performing, by a full scanning device, a full vulnerability scanning on the link if the link does not belong to a known web application.

By utilizing the website scanning apparatus and method according to the invention, when a known web application employed by a target website is identified, there is no need to perform a scanning on all the pages under the corresponding directory of the identified known web application, and only need to check the released vulnerabilities of the known web application, which may greatly increase the efficiency of scanning. Furthermore, for the identified known web application, the file structure of the corresponding directory may be directly obtained without performing a page content crawling by the crawler device, which may also reduce the bandwidth and time occupied by a page crawling.

In addition, since the website scanning apparatus and method according to the invention may update timely a newly found vulnerability by a known web application and a vulnerability fixing approach, a corresponding vulnerability in a website may be found in time and a vulnerability fixing proposal may be provided, when the website scanning apparatus and method according to the invention is utilized to identify a known web application used by the website.

Further, since a full scanning is not any more performed on the files under the corresponding directory of the identified known web application, this can reduce a false positive of various vulnerabilities of the files under these directories due to the imperfection of the scanning scheme and the complexity of the web environment.

BRIEF DESCRIPTION OF THE DRAWINGS

Other various advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

Figure 1:
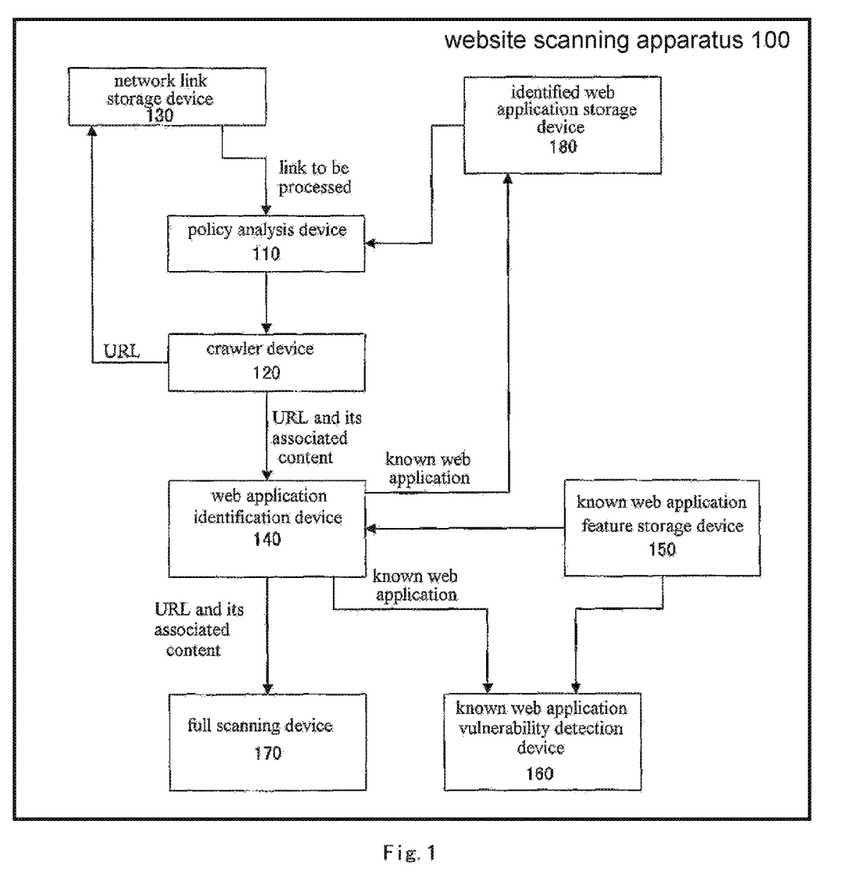
FIG. 1 shows schematically a block diagram of a website scanning apparatus 100 according to an embodiment of the invention.

FIG. 1 shows schematically a block diagram of a website scanning apparatus 100 according to an embodiment of the invention. As shown in FIG. 1, the website scanning apparatus 100 comprises a policy analysis device 110, a crawler device 120, a web application identification device 140, a full scanning device 170 and a known web application vulnerability detection device 160.

The policy analysis device 110 receives a link to be processed in a target website, and determine whether the link to be processed belongs to a certain known web application based on an identified list of known web applications that is employed by the target website. In the process of performing a scanning on the target website, the known web applications (wherein the number thereof may be arbitrary, and even no any known web application is employed) employed by the target website may be identified, and these known web applications may optionally be stored in an identified web application storage device 180. Each known web application has its own specific file directory structure, and these directory structures may be stored in relation to the web applications. By comparing the address of the link to be processed with the file directory structures of the known web applications employed by the target website, it can be determined as to whether the link to be processed belongs to a certain known web application. For example, if some identified web application has the directory structure of http://www.example.com/a/, the link to be processed with the address of http://www.example/a/b.php will be determined as belonging to the identified web application due to being under the directory structure of the web application.

If the target website does not have any identified known web application, or it is not found that the link to be processed belongs to an identified known web application, then the policy analysis device 110 sends the link to be processed to the crawler device 120 for further processing, otherwise, the policy analysis device 110 stops processing the link to be processed and obtains a next link to be processed for processing.

The crawler device 120 receives from the policy analysis device 110 a link not belonging to an identified web application, and obtains the network content corresponding to the link. The crawler device 120 may employ such a method as the network crawler, etc. to obtain the network content corresponding to the link. Of course, all the methods which may obtain the network content corresponding to the link fall within the protection scope of the invention. Furthermore, the crawler device 120 may perform an analysis on the obtained network content, extract further links included therein, and may store these links as links to be processed at a next step in a network link storage device 130. The network link storage device 130 may store a list of links to be processed, and the policy analysis device 110 may obtain a link to be processed in the list for processing from the network link storage device 130.

In addition, the crawler device 120 may also further obtain further network content associated with the obtained network content. In particular, the network content, e.g. a web page corresponding to a network link may include a further reference to an external js code, a css-format file, etc., whereas such content as a js code or a css-format file may be considered as the further network content associated with the web page. The associated further content may also be used when determining whether a certain link belongs to a known web application, and therefore the crawler device 120 may obtain the content as the associated content of the network content corresponding to the link to be processed.

The crawler device 120 sends the link to be processed and the network content of the link (optionally, also including content associated with the network content) to the web application identification device 140. The web application identification device 140 accordingly determines whether the target website employs a certain known application (optionally, it may refer to a known web application feature storage device 150 in which features of a known web application are stored). If the target website employs a certain known application, then information on the known web application is sent to the known web application vulnerability detection device for further processing, otherwise, the link and the network content thereof are sent to the full scanning device 170 for performing a full vulnerability scanning. Furthermore, the web application identification device 140 may store identified known web applications and associated information thereof (e.g. a URL, etc.) in the identified web application storage device 180 so as to be able to be used by the policy analysis device 110 to determine whether the link belongs to an identified known web application. In the following, a specific embodiment of the web application identification device 140 will be described in detail in connection with FIG. 2, however, it is to be understood that the invention is not limited to the specific embodiment, and all the web application identification devices that may determine the web application the link belongs to in accordance with the link and the content thereof fall within the protection scope of the invention.

It is to be noted that in the process in which the web application identification device 140 performs known web application identification in accordance with the link to be processed and its content, it may be necessary for it to interact with the crawler device 120 to obtain a further link and the content thereof.

The full scanning device 170 receives from the web application identification device 140 the link to be processed and optionally the corresponding network content, and performs a full vulnerability scanning on the link and its corresponding network content, for example, a scanning for the cross-site scripting attack vulnerability (XSS), the SQL injection vulnerability, the CGI vulnerability, etc. The full scanning device 170 may employ any vulnerability scanning technology in the art without being beyond the protection scope of the invention.

The known web application vulnerability detection device 160 receives from the web application identification device 140 an identified known web application, and performs a vulnerability scanning on the known web application of the target website in accordance with known vulnerabilities of the identified known web application to determine whether the known web application of the target website has been fixed for the known vulnerabilities. Optionally, the known vulnerabilities of the known web application may be stored in association with features of the known web application in the known web application feature storage device 150.

It is to be noted that, the mentioned known web application in the invention does not involve its version, but in practice, a known web application generally has multiple versions and each version has a specific feature and a different known vulnerability. Therefore, the known web application mentioned in the above may also comprise its version information, namely, the different versions of web application may be regarded as the different web applications. Thus, a version number may be stored in association with a web application feature, a web application vulnerability, etc. in the known web application feature storage device 150.

Figure 2:
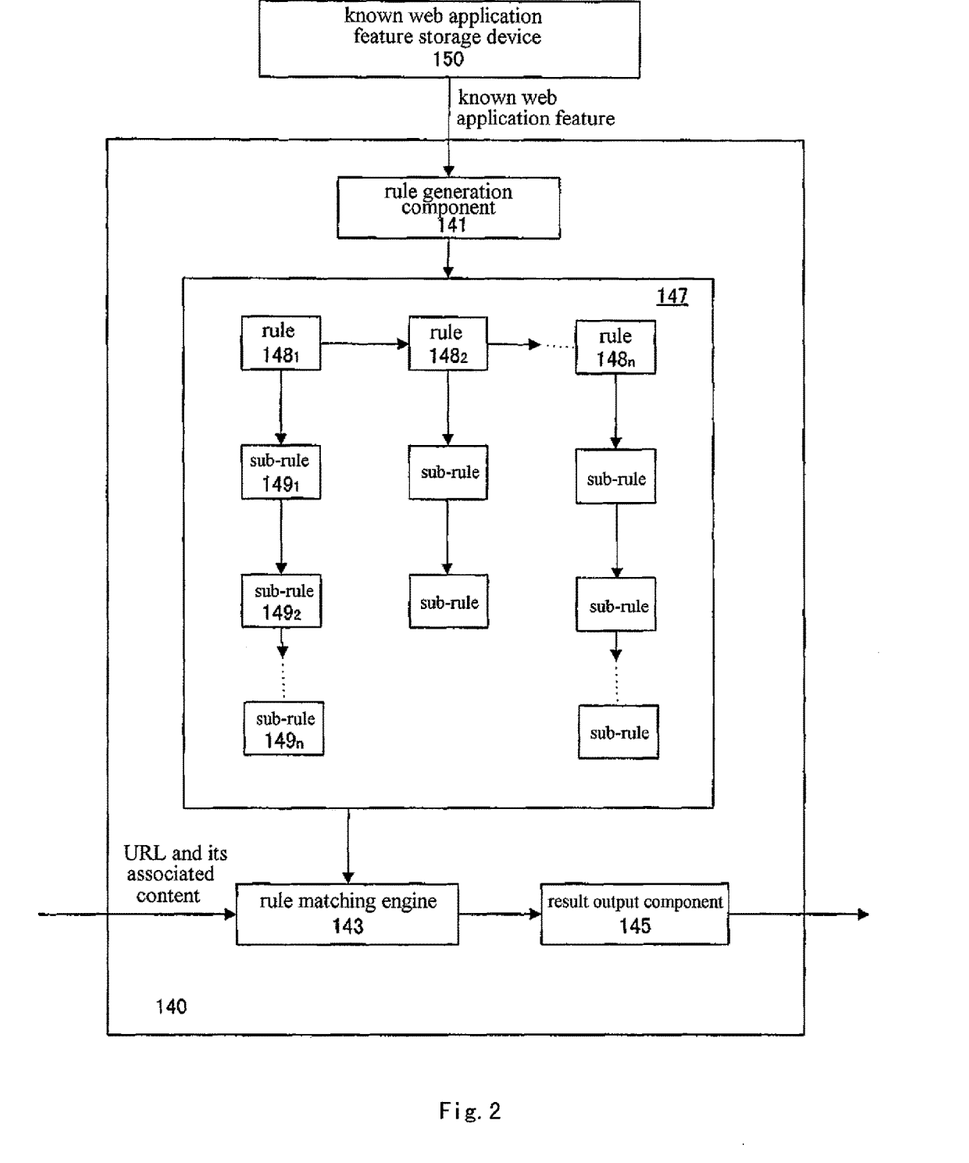
FIG. 2 shows schematically a block diagram of a web application identification device 140 in the website scanning apparatus 100.

FIG. 2 shows schematically a web application identification device 140 in the website scanning apparatus 100 according to an embodiment of the invention. As shown in FIG. 2, the web application identification device 140 comprises a rule generation component 141, a rule matching engine 143 and a result output component 145.

The rule generation component 141 generates a set of rules 147 in accordance with features of a known web application. According to an embodiment of the invention, the features of a known web application may be stored in the known web application feature storage device 150, and the rule generation component 141 may obtain the features of various known web applications from the known web application feature storage device 150 and hereby generate a set of rules 147. According to an embodiment of the invention, a known web application may have at least one of the following features:

1. A certain specific page and a specific mark in the specific page. Many web applications will embed a specific mark into some specific pages, for example, a page index.php in the forum web application Discuz! may comprise the following specific string:

<meta name="author" content="Discuz! Team and Comsenz UI Team"/>

2. A certain specific page and all the content of the specific page. Many known web applications contain some regular files, for example, files like .css,js,.ini, etc., and therefore the whole content of these files may be used as an identification mark for the web applications. According to an embodiment of the invention, a web application may be determined in accordance with the MD5 value of the whole content of these regular files. For example, the MD5 value of the regular file /language/en-GB/en-GB.ini in the known web application joomla with the version 1.5.15 is 449d7bb356fce-fa1343d72d203297438.

3. An HTTP response field: the response head of some known web applications are exclusive, e.g. the value in the response field of set-cookie, and therefore the exclusive response field may be used as a way of identifying a web application.

4. A specific link: there must be a specific network link (URL) in some known web applications, therefore a specific web application may be identified according to whether there is a specific link.

5. robots.txt. Some information on web applications used by a website can be set in the file robots.txt of the website, and therefore some information on a web application may also be obtained according to the content of this file.

Figure 3:
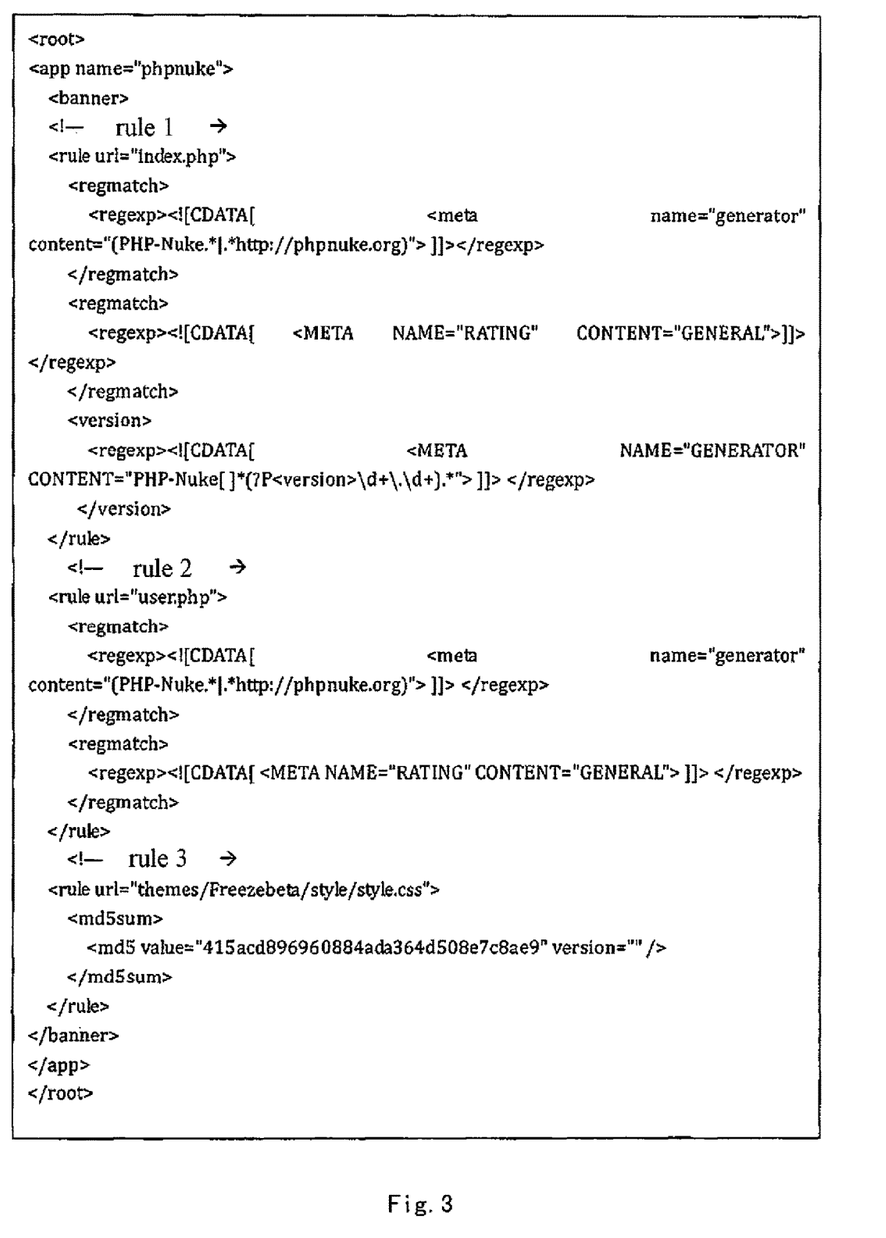
FIG. 3 shows schematically a characteristic example for the web application Discuz!

According to an embodiment of the invention, the features of a known web application may be stored in the XML format in the known web application feature storage device 150. FIG. 3 shows an XML file suitable for the web application phpnuke, from which it may be seen that there are three sub-rules for the web application phpnuke, in particular:

The first sub-rule is that specific content exists in a specific network page index.php, i.e., the specific content matching with <meta name="generator" content="(PHP-Nuke.*|.*http://phpnuke.org)"> and <META NAME="RATING" CONTENT="GENERAL">, and it is to be noted that "(PHP-Nuke.*|.*http://phpnuke.org)" therein is a specific content matching item written with the regular expression commonly used in the art, and those skilled in the art may find the specific content matching with the item according to the features of the regular expression.

The second sub-rule is that specific content exists in a specific network page user.php, i.e., the specific content matching with <meta name="generator" content="(PHP-Nuke.*|.*http://phpnuke.org)">. Likewise, the sub-rule also utilizes the regular expression.

The third sub-rule is that there exists a certain specific page themes/Freezebeta/style/style.css and all the content of the specific page, wherein the MD5 value of all the content of the page is 415acd896960884ada364d508e7c8ae9.

In addition, the version of the web application may also be determined by "<META NAME="GENERATOR"

CONTENT="PHP-Nuke[ ]*(?P<version>\d+\.\d+).*">" in the specific network page index.php.

It is to be noted that although some specific examples have been given above about the features of a web application, the features of a known web application are not limited thereto, and other features of a web application may be easily contemplated by those skilled in the art from the inspiration given by the invention.

According to an embodiment of the invention, each web application has one or more web application features, and hence the set of rules 147 has a corresponding structure, namely, the set of rules 147 comprises rules $148_1$, $148_2$, ... $148_n$, etc. respectively corresponding to each web application, and each rule $148_1$, $148_2$, ... $148_n$ has one or more sub-rules $149_1$, $149_2$, ... $149_m$, etc. corresponding to the web application features of the web application.

The rule matching engine 143 obtains the link to be processed and the network content corresponding to the link, extracts features in the link to be processed and the content of the link, subsequently refers to the set of rules 147, and determines whether the extracted features in the link to be processed and the content of the link match with a certain rule in the set of rules. When all the sub-rules in a certain rule are matched, the rule is considered as being matched, and it is determined that the link belongs to a web application corresponding to the rule, namely, the web application exists in the target website. On the contrary, if it is determined that the link to be processed does not match with any rule in the set of rules 147, then the link to be processed is considered as not belonging to any known web application. Subsequently, a matching result is output via the result output component 145.

It is to be noted that, as described above, a known web application may have multiple sub-rules, and an individual sub-rules may involve a different link (i.e., a web page). Therefore, when the rule matching engine 143 determines whether the features in the extracted link to be processed and the content of the link match with a certain rule in the set of rules, the crawler device 120 obtains the link; when the rule matching engine 143 performs a matching of sub-rules for the link obtained by the crawler device 120, the link to be processed is considered as belonging to a known web application corresponding to a certain rule if the link to be processed matches all the sub-rules as a whole in the rule.

For example, with reference to the example of FIG. 3, when rules of phpnuke exist in the rule matching engine 143, and when the crawler device 120 obtains the link index.php and its content, the rule matching engine 143 determines whether index.php matches with the first sub-rule. If there exists such specific content as <meta name="generator" content="(PHP-Nuke.*|.*http://phpnuke.org)"> and <META NAME="RATING" CONTENT="GENERAL"> in index.php, then the first sub-rule is matched successfully. When the crawler device 120 obtains the link user.php and its content, the rule matching engine 143 determines whether user.php and its content match with the second sub-rule. If there exists such specific content as <meta name="generator" content="(PHP-Nuke.*|.*http://php-nuke.org)"> in user.php, then the second sub-rule is matched successfully. When the crawler device 120 obtains the link: themes/Freezebeta/style/style.css, the rule matching engine 143 determines whether it matches with the third sub-rule. If its MD5 value is 415acd896960884ada364d508e7c8ae9, then the third sub-rule is matched successfully. Of course, if only one sub-rule is not matched, then the rule matching engine 143 determines that the link to be processed does not belong to a certain known web application.

Optionally, upon determining that the link to be processed belongs to a known web application, the rule matching engine 143 stores the identified known web application and the directory location of the known web application on the target website (which can be determined according to the link to be processed and the directory structure of the known web application) in the identified web application storage device 180, so as to be able to be used later by the policy analysis device 110 to determine whether the link belongs to an identified known web application.

The efficiency of the website scanning apparatus 100 according to the invention is greatly increased by determining whether a file (i.e., a link) on the target website belongs to a known web application prior to performing a scanning for the file, then performing a full scanning only for a file not belonging to a known web application, whereas performing a check according to currently known vulnerabilities of known web applications and not performing a full check for the known web applications employed by the website, thereby reducing the number of full scanning.

Figure 4:
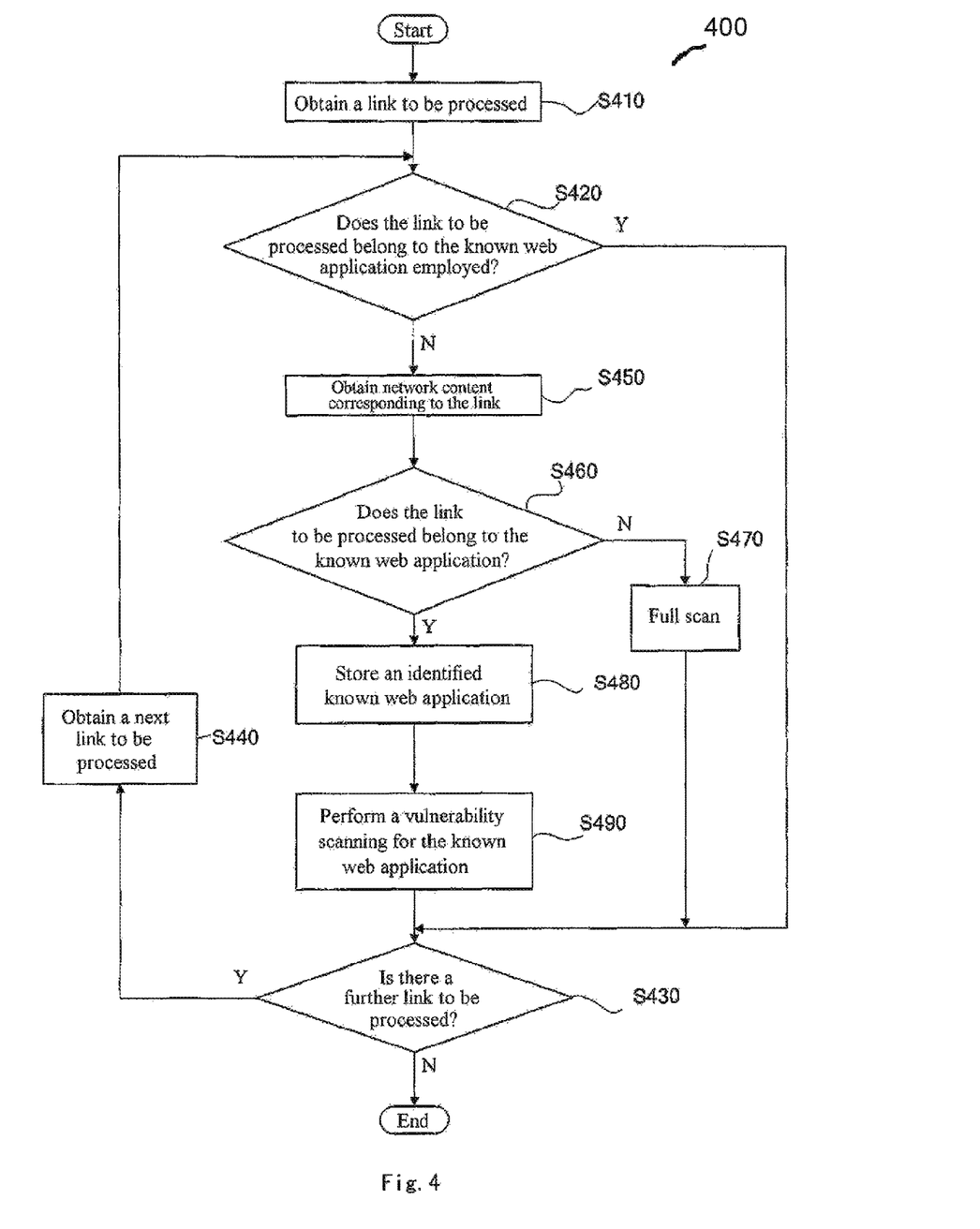
FIG. 4 shows schematically a flow chart of a web scanning method 400 according to an embodiment of the invention.

FIG. 4 shows a flow chart of a web scanning method 400 according to an embodiment of the invention, which method may be carried out in the website scanning apparatus 100 as described above. As shown in FIG. 4, the web scanning method 400 begins at a step S410, wherein a link to be processed is obtained. Optionally, the link to be processed may be stored in advance in a list of links to be processed of a network link storage device 130, and a link to be processed may be obtained from the list of links to be processed for processing. Next, at step S420, it is determined whether the link to be processed belongs to a certain known web application based on a list of known web applications employed by a target website. As described above, it may be determined whether the link to be processed belongs to a certain known web application by comparing the address of the link to be processed with the file directory structure of a known web application employed by the target website. If the link to be processed belongs to a certain known web application, then the link to be processed is not processed any more and the method proceeds to step S430 to determine whether there is a further link to be processed in the list of links to be processed. If the link to be processed does not belong to a known web application employed by the target website, then the method goes to step S450. The process at the step S420 may be carried out by a policy analysis device 110 of the website scanning apparatus 100.

At step S450, a crawler device obtains the network content corresponding to the link to be processed, performs an analysis on the obtained network content, extracts further links included therein, and may add these links to the list of links to be processed as the links to be processed at the next step. Furthermore, as described above, at step S450 further network content associated with the obtained network content may also be obtained.

Next, at step S460, reference is made to the features of a known web application to perform an analysis on the link to be processed and the network content of the link (optionally, also including the content associated with the network content) to determine whether the link to be processed belongs to the known web application, namely, whether the known web application exists in the target website. In the following, the process of the step S460 will be further described with reference to FIG. 5. If the link to be processed does not belong to any known web application, then at step S470 a full vulnerability scanning is performed on the link to be processed and its network content. If it is determined that the link to be processed belongs to a known web application at step S460, i.e., the known web application exists in the target website, then the identified known web application and its associated information (e.g., a URL, etc.) are stored at step S480, such that they can be used later when determining whether the link to be processed belongs to a known web application employed by the target website.

It is to be noted that, when the link to be processed is analyzed at the step S460 to determine whether a known web application exists in the target website, it may be necessary to obtain some further links and the content thereof by the crawler device so as to determine exactly whether the known web application exists in the target website.

Next, at step S490, a vulnerability scanning is performed on the known web application in the target website according to known vulnerabilities of identified known web applications, so as to determine whether the known web application in the target website is fixed for the known vulnerabilities.

Next, when at the step S430 it is determined that there is a further link to be processed, a further link to be processed is obtained from the list of links to be processed at step S440, and the method returns to the step S420 to repeat the process. If at step S430 it is determined that there are no links to be processed, then the method 400 ends.

Figure 5:
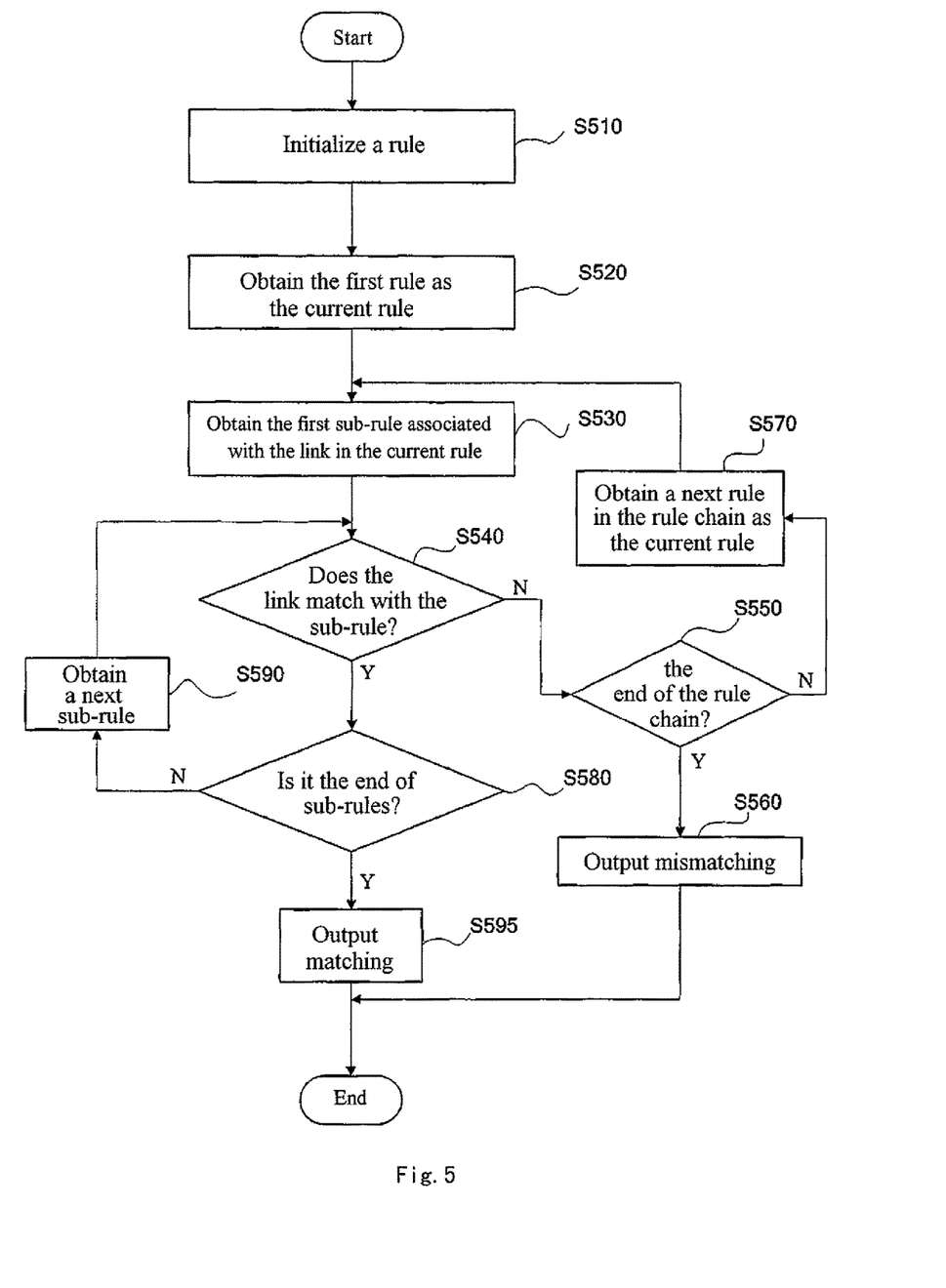
FIG. 5 shows schematically a flow chart of a web application identification method in the web scanning method 400.

FIG. 5 shows a particular flow chart of the step S460, i.e., a method for determining whether a link belongs to a known web application, in the web scanning method 400 according to an embodiment of the invention. As shown in FIG. 5, the method begins at step S510, wherein a set of rules is initialized, that is, the set of rules is generated according to the features of a known web application (according to an embodiment of the invention, these known web application features may be stored in a certain format (e.g., an XML file format) in the known web application feature storage device 150 in advance). The set of rules has the format as described above. Optionally, the initialization of the set of rules can be finished before the process as shown in FIG. 5 is performed, and it is unnecessary to perform the process of initialization each time determining a link.

Next, at step S520 the first rule in the set of rules is obtained as the current rule, and at step S530 the first sub-rule in association with a link to be processed and its content in the current rule is obtained as the current sub-rule. At step S540, it is determined whether the link to be processed and its associated network content match with the current sub-rule. In the above, the specific content about a known network feature as well as its rule and sub-rule has been given in the description in connection with FIG. 2, which will not be described in detail hereby.

When determining mismatch at step S540, it is determined whether there is a further rule on which a matching is not performed in the set of rules at step S550. If at step S550 it is determined that there is no rule on which a matching is not performed, then at step S560 the result is output that the link to be processed does not belong to a known web application and the method ends; on the contrary, if at step S550 it is determined that there is a further rule on which a matching is not performed, then at step S570 a next rule in the set of rules is obtained as the current rule, and the method returns to the step S530 for performing a further processing.

When at step S540 it is determined that the link to be processed and its associated network content match with the current sub-rule, it is determined at step S580 whether there are further other sub-rules in the current rule. If at step S580 it is determined that there is a sub-rule on which a matching is not performed, then at step S590 a next sub-rule is obtained as the current sub-rule, and the method returns to the step S540 for performing the sub-rule matching. It is to be noted that, as described above, a known web application may have multiple sub-rules, and individual sub-rules may involve different links. Therefore, the next sub-rule obtained at the step S590 may involve a further link, based on which the step S590 also comprises the step of obtaining a link associated with the current sub-rule and its content.

On the contrary, if it is determined at the step S580 that all the sub-rules in the current rule match with the link to be processed and its associated content, then it is determined that the link to be processed belongs to a known web application corresponding to the current rule, and the known web application is output at a step S595. Optionally, the location of the known web application on the target website (e.g., the file location relative to the root directory of the target website) may also be output at the step S595 to be used later by the above step S420 to determine whether the link to be processed belongs to a known web application employed by the target website.

It is to be noted that, in individual components of the website scanning apparatus 100 of the invention, the components therein are divided logically according to the functions to be realized by them, however, the invention is not limited thereto, and individual components may be re-divided or combined as needed, for example, some components may be combined into a single component, or some components may be further divided into more sub-components.

Embodiments of the individual components of the invention may be implemented in hardware, or in a software module running on one or more processors, or in a combination thereof. It is appreciated by those skilled in the art that, in practice, some or all of the functions of some or all of the components in a website scanning apparatus according to an embodiment of the invention may be implemented using a microprocessor or a digital signal processor (DSP). The invention may also be implemented as an apparatus or a device program (e.g., a computer program or a computer program product) for carrying out a part or all of the method described herein. Such a program implementing the invention may be stored on a computer readable medium, or may be in the form of one or more signals. Such a signal may be obtained by downloading it from an Internet website, or provided on a carrier signal, or provided in any other forms.

Figure 6:
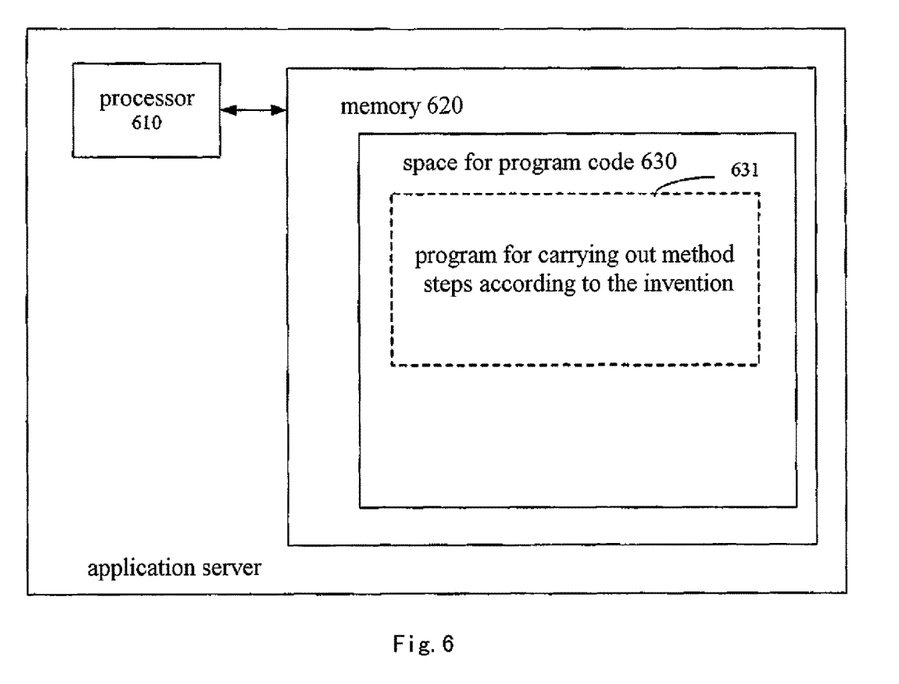
FIG. 6 shows schematically a block diagram of a server for carrying out a method according to the invention.
Figure 7:
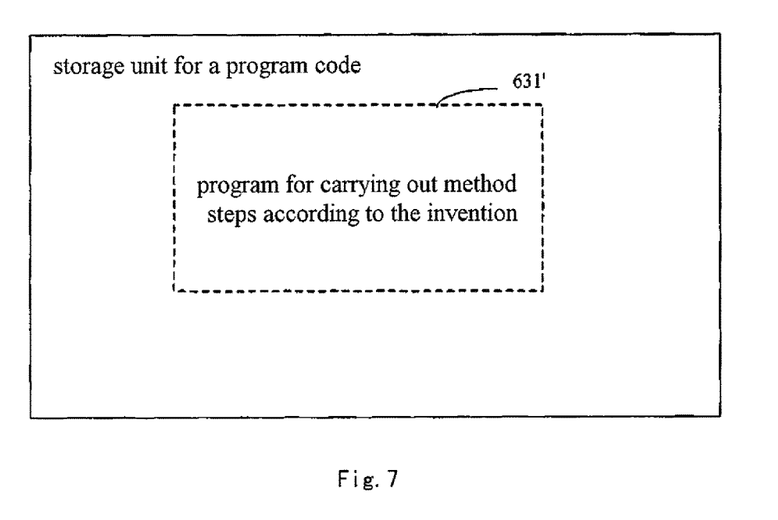
FIG. 7 shows schematically a storage unit for maintaining or carrying a program code implementing a method according to the invention.

For example, FIG. 6 shows a server which may carry out a web scanning method according to the invention, e.g., an application server. The server traditionally comprises a processor 610 and a computer program product or a computer readable medium in the form of a memory 620. The memory 620 may be an electronic memory such as a flash memory, an EEPROM (electrically erasable programmable read-only memory), an EPROM, a hard disk or a ROM. The memory 620 has a memory space 630 for a program code 631 carrying out any method steps of the methods as described above. For example, the memory space 630 for a program code may comprise individual program codes 631 for carrying out individual steps in the above methods respectively. These program codes may be read from or written to one or more computer program products. These computer program products comprise such a program code carrier as a hard disk, a compact disk (CD), a memory card or a floppy disk. Such a computer program product is generally a portable or stationary storage unit as described with reference to FIG. 7. The storage unit may have a memory segment, a memory space, etc. arranged in the similar way to the memory 620 in the server of FIG. 6. The program code may for example be compressed in an appropriate form. In general, the storage unit comprises computer readable codes 631', i.e., codes which may be read by a processor such as 610, and when run by a server, these codes cause the server to carry out individual steps in the methods described above.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

The invention claimed is:

1. A website scanning server comprising:
 a policy analysis device having a processor that determines whether a link in a website
 belongs to an identified web application in the website based on a list of identified known web applications that are employed by the website, wherein if the link belongs to the identified web application, then a vulnerability scanning is not performed on the link;
 a crawler device having a processor that, when the link is determined as not belonging to the identified web application, obtains link content corresponding to the link not belonging to the identified web application;
 a web application identification device having a processor that determines whether the website employs a known web application containing known vulnerabilities based on the link and the link content received from the crawler device by making reference to features of the known web application, and determines the known web application as a newly identified web application in the website when the website employs the known web application;
 a full scanning device having a processor that performs a full vulnerability scanning on the link not belonging to the identified web application when the website does not employ the known web application;
 a known web application vulnerability detection device having a processor that, when the website employs the known web application, performs a vulnerability detection on the known web application of the website according to the known vulnerabilities of the known web application, to determine whether the known web application of the website is fixed for the known vulnerabilities; and a website link storage device for storing one or more links in the website, wherein the crawler device is further used for performing an analysis on the obtained link content to extract one or more links included in the link content, and placing the extracted one or more links in the website link storage device, and the policy analysis device performs a determination for each link in the website link storage device.

2. The website scanning server as claimed in claim 1, further comprising:
 an identified web application storage device for storing one or more identified web applications in the website.

3. The website scanning server as claimed in claim 1, further comprising:
 a known web application feature storage device for storing the features of the known web application and one or more vulnerabilities associated with the known web application.

4. The website scanning server as claimed in claim 1, wherein the web application identification device further comprises:
 a rule generation component having a processor that generates a set of rules in accordance with the features of the known web application; and
 a rule matching engine having a processor that obtains the link and the link content, extracting features of the link and the link content, determining whether one of the rules in the set of rules is matched in accordance with the features of the link and the link content, and determining a known web application corresponding to the matched rule as the known web application the link belongs to.

5. The website scanning server as claimed in claim 4, wherein each rule of the set of rules corresponds to each known web application, each rule has one or more sub-rules, and each sub-rule corresponds to a feature of the corresponding known web application,
 wherein only when all the sub-rules in a certain rule are matched, the rule is determined as being matched.

6. The website scanning server as claimed in claim 5, wherein a sub-rule in each rule is associated with a link,
 when the rule matching engine determines that the features of the link and the link content match with the sub-rule of the certain rule, a further link and its content associated with other sub-rules of the rule are obtained by the crawler device, and only when the further link and its content match with the other sub-rules in the rule, it is determined that the rule is matched.

7. The website scanning server as claimed in claim 4, wherein the features of the known web application comprise one or more of the following features:
 a specific page and a specific mark in the specific page;
 the specific page and all the content of the specific page;
 an HTTP response field; and
 a specific link.

8. The website scanning server as claimed in claim 1, wherein a known web application feature storage device further stores the features of the known web application and one or more known vulnerabilities, in association with a version of the known web application.

9. The website scanning server as claimed in claim 2, wherein the web application identification device stores a newly identified web application and a directory location of the newly identified web application on the website in the identified web application storage device.

10. A website scanning method comprising the steps of:
 determining, by a policy analysis device, whether a link in a website belongs to an identified web application in the website based on a list of identified known web applications that are employed by the website;
 when the link belongs to the identified web application, avoiding a performance of a vulnerability scan on the link;
 when the link does not belong to the identified web application, receiving the link determined as not belonging to the identified web application from the policy analysis device and obtaining link content corresponding to the link not belonging to the identified web application, by a crawler device;

determining, by a web application identification device, whether the website employs a known web application containing known vulnerabilities based on the link and the link content corresponding to the link received from the crawler device by making reference to features of the known web applications;

determining the known web application as a newly identified web application in the website and performing by a known web application vulnerability detection device, a vulnerability detection on the newly identified web application of the website according to known vulnerabilities of the known web application to determine whether the known web application of the website is fixed for the known vulnerabilities, if the website employs the known web application;

performing, by a full scanning device, a full vulnerability scanning on the link if the website does not employ the known web application;

performing, by the crawler device, an analysis on the obtained link content to extract one or more links included in the link content, and placing the extracted one or more links in a website link storage device; and performing, by the policy analysis device, a determination for each link in the website link storage device.

11. The website scanning method as claimed in claim 10, wherein the step of determining whether the link belongs to the known web application comprises:

generating a set of rules in accordance with features of each known web application in one or more known web applications;

extracting features of the link and the link content, and determining whether the features of the link and the link content match with one of the rules in the set of rules, and if matched, determining the known web application corresponding to the matched rule as the known web application the link belongs to.

12. The website scanning method as claimed in claim 11, wherein each rule of the set of rules corresponds to each known web application, each rule has one or more sub-rules, and each sub-rule corresponds to a feature of a corresponding known web application, and wherein only when all the sub-rules in a certain rule are matched, it is determined that the features of the link and the link content match with the rule.

13. The website scanning method as claimed in claim 12, wherein the step of determining whether the features of the link and the link content match with the one of the rules in the set of rules further comprises:

when determining that the one or more sub-rules in a rule match with the features of the link and the link content, and that the rule further has a sub-rule associated with a further link:

obtaining the further link and its content, and determining whether the further link and its content match with other sub-rules in the rule.

14. The website scanning method as claimed in claim 11, wherein the features of the known web application comprise one or more of the following features:

a specific page and a specific mark in the specific page;

the specific page and all the content of the specific page;

an HTTP response field; and a specific link.

15. The website scanning method as claimed in claim 10, wherein the features of the known web application and one or more known vulnerabilities are associated with the version of the known web application.

16. The website scanning method as claimed in claim 10, wherein the method is performed by a computer program comprising a computer readable code, running on a server.

17. The website scanning method as claimed in claim 16, wherein the computer program is stored on a computer readable medium.

18. The website scanning method as claimed in claim 10, wherein when the link not belonging to the identified web application is determined as belonging to the known web application, the newly identified web application and a directory location of the newly identified web application on the website are stored.

* * * * *